Powel

[11] 3,929,220
[45] Dec. 30, 1975

[54] PALLET CONVEYOR HAVING RELATIVELY ADJUSTABLE PUSHER HEADS

[75] Inventor: William Roy Powel, Leatherhead, England

[73] Assignee: Powel International Limited, England

[22] Filed: July 15, 1974

[21] Appl. No.: 488,407

[30] Foreign Application Priority Data
July 26, 1973 United Kingdom............... 35706/73

[52] U.S. Cl................................. 198/164; 198/170
[51] Int. Cl.²......................................... B65E 15/14
[58] Field of Search ........... 198/164, 168, 170, 171, 198/175, 176, 110

[56] References Cited
UNITED STATES PATENTS
| | | | |
|---|---|---|---|
| 2,090,928 | 8/1937 | Aisher | 198/170 |
| 3,294,215 | 12/1966 | Walter | 198/173 X |
| 3,677,686 | 7/1972 | Powel | 198/170 |

FOREIGN PATENTS OR APPLICATIONS
| | | | |
|---|---|---|---|
| 454,952 | 10/1936 | United Kingdom | 198/170 |

Primary Examiner—Robert J. Spar
Assistant Examiner—James M. Slattery
Attorney, Agent, or Firm—Burns, Doane, Swecker & Mathis

[57] ABSTRACT

A conveyor for feeding pallets to a tile making machine, the conveyor including a chain having a linear driving run, parallel with a pallet support track and having pushers spaced therealong, the pushers having noses to engage pallets on the track and followers each of which, when the associated pusher is moving along the driving run, engages a follower track, the track being angled relative to the driving run, and causes the associated nose to travel along the driving run at a constant speed less than the speed of the driving run, the follower being adjustable to vary the distance between a nose of a pusher whose follower is part way along the follower track and the nose of a pusher whose follower is at the start of the follower track to thereby make up for chain wear and for different pallet lengths.

6 Claims, 4 Drawing Figures

PALLET CONVEYOR HAVING RELATIVELY ADJUSTABLE PUSHER HEADS

This invention relates to conveyors and more particularly conveyor machines for producing roofing tiles or the like from cement, mortar or other cementitious mix.

Tiles today are made by feeding a line of end-to-end pallets, the top of each of which corresponds to the shape of the underface of a tile, along a track, under a hopper of wet mix, and beneath a shaping device which corresponds to the transverse shape of the upper surface of the tiles. Passage of the line of pallets past the hopper causes mix to be extruded between the upper surface of the line and the shaper device as the line emerges from the hopper. The pallets are advanced along the track by pushing the line forward and various conveying mechanisms have been proposed for this.

According to this invention there is provided a conveyor for a tile making machine, the conveyor comprising a pallet track for receiving and supporting pallets to be conveyed, a drive chain having a rectilinear driving run which extends in the direction of the length of the track, a plurality of pushers spaced along the chain, each pivotally coupled to the chain and each including a head for engaging a pallet and a follower, and a follower track adjacent the driving run and angled relative to that run, the followers during travel along the driving run engaging the follower track of which the angle is such that, when the chain is driven at constant speed, the heads will move in the direction of travel of the driving run at a constant speed less than the speed of the chain in that run, and the track being adjustable to vary the angle relative to the driving run and thereby the linear distance between adjacent pusher heads when the follower of one is at the limit of the track nearest the driving run and the other is situated with its follower in engagement with the track at a point spaced from that limit such that different pallet lengths or changes in chain length can be accommodated.

In order that the invention may be well understood there will now be described an embodiment thereof, given by way of example only, reference being had to the accompanying drawings, in which.

Figure 1:
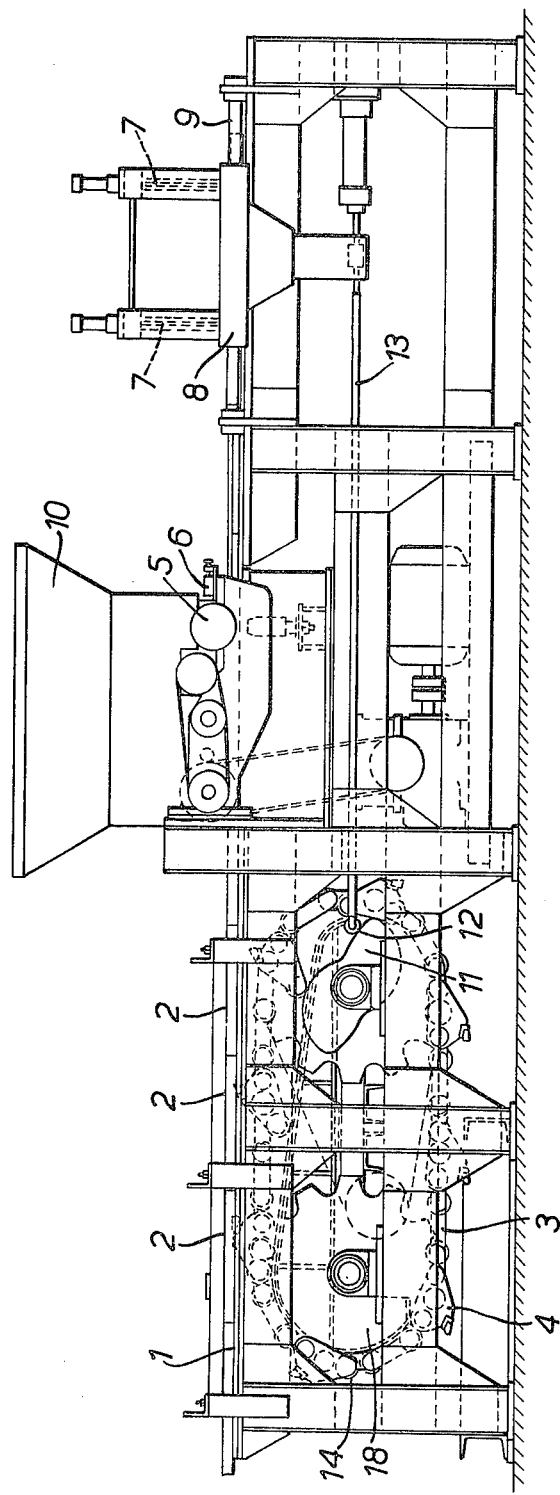
FIG. 1 is a side elevation of a tile making machine.
Figure 2:
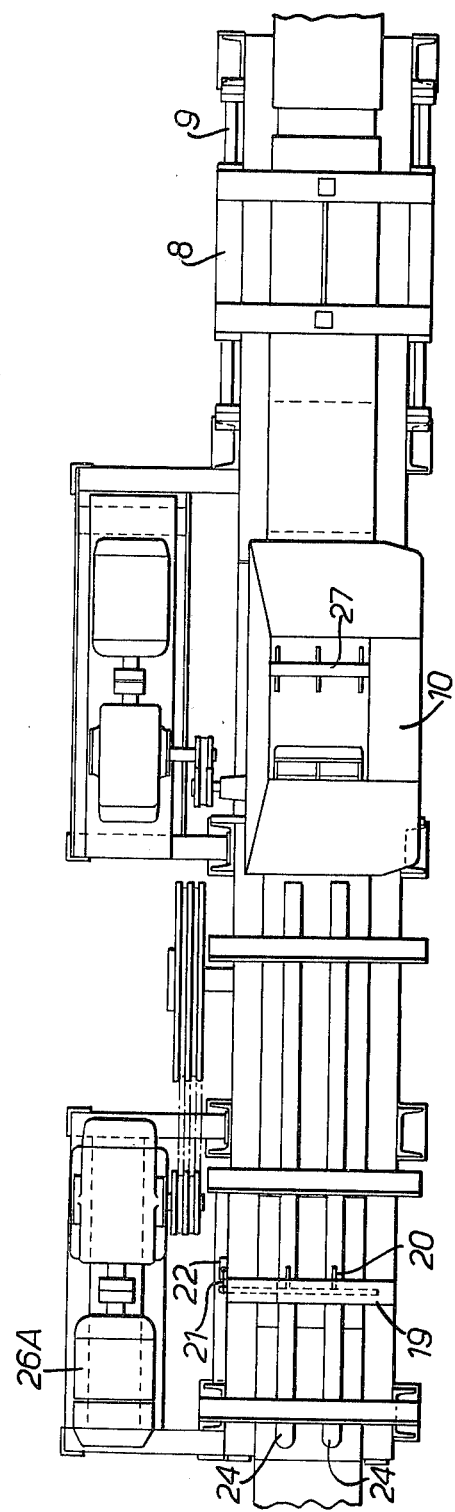
FIG. 2 is a plan view of the machine.

The tile making machine comprises rails 1 which receive from a mechanism (not shown) plates, moulds or pallets 2 in an end-to-end stream.

There is a driving mechanism including a pair of chains 3, between which are mounted pushers 4 each of which, when travelling along the upper driving run of the chains, engages with a rearwardly directed face on the underside of a pallet to thrust that pallet and those ahead of it forward under a hopper 10. This hopper contains an agitating shaft 27 and a profiled roller 5, together with a profiled blade 6 which acts as a doctor blade against the roller. The end-to-end pallets leave the hopper carrying a ribbon of the cementitious mix which is cut to tile length by knives 7 mounted on a framework 8 slidable on rods 9. The frame carrying the cutting knives is moved forwards and returned by a cam 11 on which bears a roller 12 carried by a rod 13 coupled at its other end with the framework. The knives thus can cut the ribbon while the ribbon is advancing.

Figure 3:
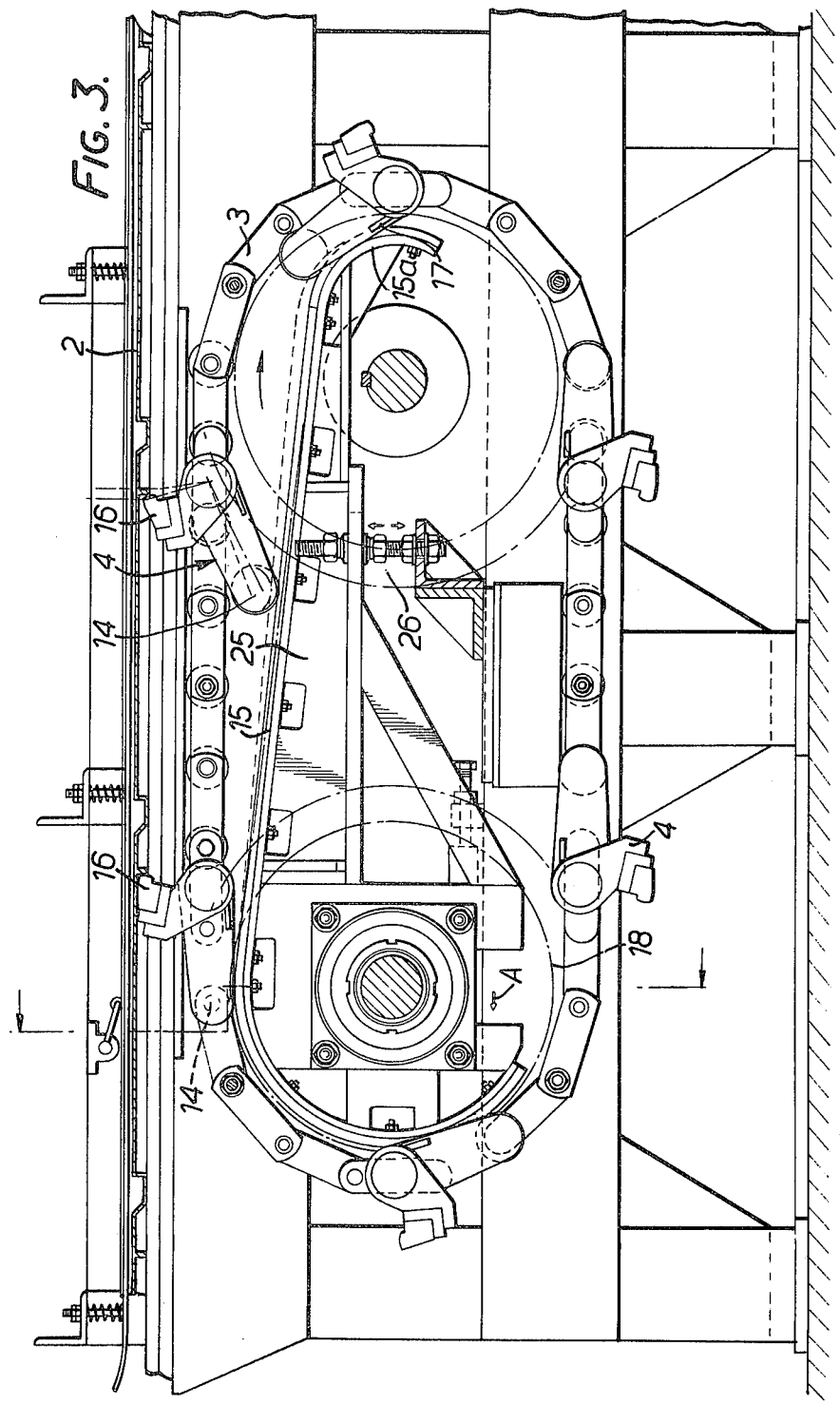
FIG. 3 is an enlarged sectional elevation of the pallet conveyor mechanism.
Figure 4:
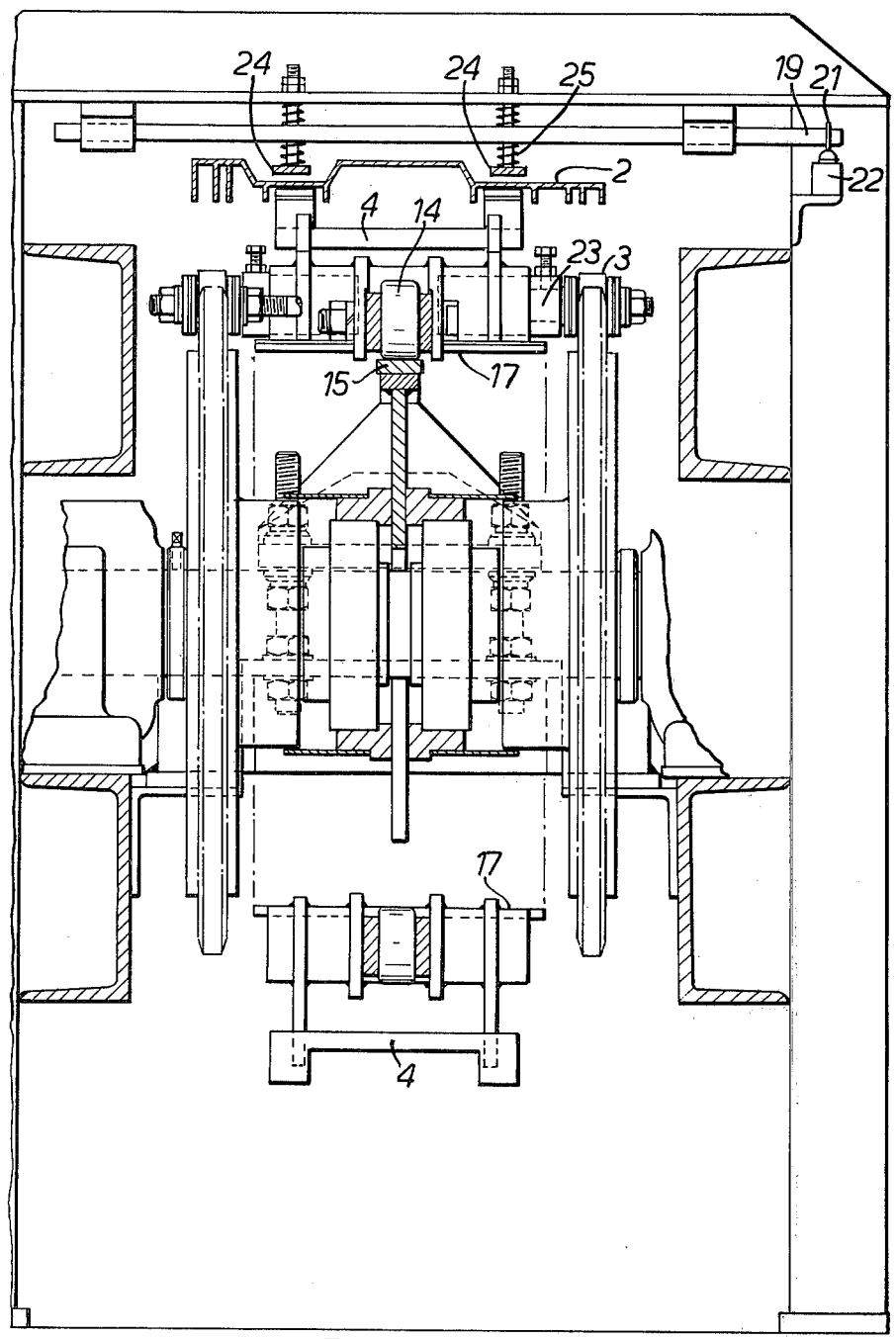
FIG. 4 is a partial section on the line IV—IV of FIG. 3, parts including the pallet track having been omitted.

Referring to FIG. 3, the pushers 4 are spaced along the chains and each is pivotally connected to the chains 3, and includes a trailing follower 14 which, when the pusher is on the upper driving chain flight, runs on a track 15. The track is inclined downwardly in the direction of travel of the upper chain flight and therefore a head 16 of each pusher as it moves along the upper flight in the driving direction has a lower linear speed than the upper chain flight. The inclination of this track is constant and does not vary in angle so that the linear speed of the heads is constant. As the pushing member advances with its trailing follower running down the track it does not lose contact with the pallet 2 until after the next pusher has arrived at its pushing position and takes over the driving of the end-to-end stream.

For this method of driving the pallets forward a standard pitch chain can be used and the inclination of the track can be varied according to the length of the pallets. Hence a variety of pallets can be used on the machine.

The pivoted pushers are not allowed to swing free. The pushers tend to rotate about their pivot axes anticlockwise as viewed in FIG. 3 so that, whether or not pallets are present, the pushers will take up the same attitude in the upper run.

As can be seen from FIG. 3, as the pushers arrive at the lowest end of the track they pass round a curved section 15a which restores the position of each pusher to the position in relation to the chain which is held at the top of the track. Bracket stops 17 provided on the pushers rest on parts 23 attached to the chain during travel along the idle run of the chain, the brackets being biased to that attitude by gravity. The pushers remain in this position relative to the chain without the necessity of any special track until they pass around chain sprocket 18 and arrive again at the top position where they again take up the pushing of the pallets.

As a pusher 4 travels round the sprocket 18 and the follower arrives at the top dead centre of sprocket 18, the head is disposed relative to the face of the pallet 2 to be driven. That may be the pallet immediately behind the pallet engaged by the preceding pusher or a whole number of pallets behind that pallet. Then begins the push by that head. This pushing action can be exerted on the end of the pallet or it can push on a face specially provided for the purpose. For a brief period both pushers whose followers are on the track together are driving the line of pallets.

In the event of the position of a pallet being incorrect to receive a pusher 4, the pusher therefore coming up to the pushing position lifts the pallet in the process and pallet retaining rails 24 will be lifted by this action. The rails 24 are spring mounted, springs 25 being provided for this purpose. This upward movement of the rails 24 will react on a lever 20 which will rotate a shaft 19 to cause a further lever 21 to operate a micro-switch 22 electrically connected in a no-volt circuit of an electric motor drive 26 thus stopping the machine. The machine will remain stopped until the fault in the position of the pallet is corrected.

The track 15 is carried on a frame 25 which is pivoted about the axis of chain sprockets 18 and its angular position is adjusted by means of adjustable stop 26. In FIG. 3 the track is shown in full lines in an intermediate angular position and broken and chain lines indicate positions of the track to either side of the intermediate position and the resultant displacements of the head 16 of a pusher spaced from the limit of the track nearest the driving run, i.e. at top dead centre of sprocket 18. It can be seen that the distance between heads in the upper run is variable and therefore pallets of different lengths can be used. Furthermore, if the chain stretches, while the slack can be taken up by moving sprocket 18 as indicated by arrow A, the increased spacing of the pusher pivot axes can be compensated for by varying the track angle. Thus given a constant chain speed, constant pallet speed is provided, different pallet lengths can be used and displacement of pushers due to wear can be compensated.

What is claimed is:

1. A conveyor for a tile making machine, the conveyor comprising:
   frame means defining a pallet track for receiving and supporting a line of end-to-end pallets to be conveyed;
   a drive chain mounted for movement adjacent said pallet track;
   said drive chain including a linear driving run which extends in the direction of said track;
   a plurality of pushers carried by said drive chain in spaced relation therealong, each pusher being pivotally coupled to the chain and including:
   a head portion for engaging and pushing a contact surface of a pallet to advance the line of pallets, and
   a follower portion;
   a follower track disposed adjacent at least a substantial portion of the driving run of said chain and being arranged to support and guide the follower portions of pushers traveling along said driving run in driving engagement with the pallets;
   said follower track being angularly inclined relative to said driving run in a manner for guiding said follower portions for rotational movement relative to said chain to rotate said head portions in a direction opposed to the direction of travel of said driving run, so that with the chain being driven at constant speed the head portions advance the line of pallets at a constant speed less than the speed of the driving run; and
   adjustment means operably connected to said follower track for adjusting the inclination angle of said follower track relative to said driving run so as to vary the distance between the head portion of a pusher located at the beginning of the track and the head portion of a pusher disposed on the track to accommodate different length pallets and changes in effective chain length.

2. A conveyor according to claim 1 in which the track diverges from the driving run in the direction of travel of that run, and said followers are drawn along by the driving run and engage a face of the track directed toward that run.

3. A conveyor according to claim 2 in which the track is pivotally supported about the axis of a chain sprocket toward which the track and driving run converge.

4. A conveyor according to claim 2 in which the chain passes about two chain sprockets about the axes of which end portions of the track are concentrically curved.

5. A conveyor according to claim 4 in which each pusher is biased about its pivotal axis by gravity in a direction to engage the follower with the track, stop means being provided on each pusher to engage the chain when the follower is clear of one end of the track to maintain the pusher in an attitude relative to the chain in which the pusher will be accepted by the other end of the track.

6. A conveyor according to claim 1 in which means are provided for tensioning the chain.

* * * * *